United States Patent
Yamamoto

(10) Patent No.: US 11,798,388 B2
(45) Date of Patent: Oct. 24, 2023

(54) LOCATION POSITIONING SYSTEM

(71) Applicant: OTTA INC., Fukuoka (JP)

(72) Inventor: Fumikazu Yamamoto, Fukuoka (JP)

(73) Assignee: OTTA INC., Fukuoka (JP)

( * ) Notice: Subject to any disclaimer, the term of this patent is extended or adjusted under 35 U.S.C. 154(b) by 0 days.

(21) Appl. No.: 17/924,229

(22) PCT Filed: Feb. 19, 2021

(86) PCT No.: PCT/JP2021/006272
§ 371 (c)(1),
(2) Date: Nov. 9, 2022

(87) PCT Pub. No.: WO2021/229883
PCT Pub. Date: Nov. 18, 2021

(65) Prior Publication Data
US 2023/0177940 A1     Jun. 8, 2023

(30) Foreign Application Priority Data

May 11, 2020  (JP) ................. 2020-083139

(51) Int. Cl.
*G08B 21/02*     (2006.01)
*H04W 4/029*     (2018.01)
(Continued)

(52) U.S. Cl.
CPC ..... *G08B 21/0269* (2013.01); *G08B 21/0277* (2013.01); *H04W 4/027* (2013.01);
(Continued)

(58) Field of Classification Search
CPC ............ G08B 21/0269; G08B 21/0277; G08B 21/02; G08B 25/04; H04W 4/027;
(Continued)

(56) References Cited

U.S. PATENT DOCUMENTS

2008/0305785 A1   12/2008   Ito
2010/0062746 A1*  3/2010   Proctor, Jr. ........ G06Q 20/3278
                                                            370/328
(Continued)

FOREIGN PATENT DOCUMENTS

JP   2002-186040 A    6/2002
JP   2008-306558 A   12/2008
(Continued)

*Primary Examiner* — James J Yang
(74) *Attorney, Agent, or Firm* — Young Basile Hanlon & MacFarlane, P.C.

(57) ABSTRACT

A location positioning system notifies of a message by a method according to a situation of a subject while grasping a location of the subject to be watched. The system includes a subject terminal carried by the subject, a server, a judgement unit, and a determination unit. The subject terminal transmits identification information for specifying a location of the terminal through a wireless communication and receives a message directed to the subject, and notifies the subject of reception of the message by at least one output method. The server specifies the location of the subject terminal based on the identification information. The judgement unit judges whether the subject is present indoors or outdoors, based on the location of the subject terminal specified by the server and the map information stored in advance. The determination unit determines an output method of notification by the subject terminal according to the judgement result.

14 Claims, 8 Drawing Sheets

(51) Int. Cl.
   *H04W 4/80* (2018.01)
   *H04W 4/02* (2018.01)
   *H04W 4/12* (2009.01)

(52) U.S. Cl.
   CPC ............ *H04W 4/029* (2018.02); *H04W 4/12* (2013.01); *H04W 4/80* (2018.02)

(58) Field of Classification Search
   CPC ......... H04W 4/029; H04W 4/12; H04W 4/80; H04W 4/02; H04W 4/021; H04W 4/33; H04M 11/00
   See application file for complete search history.

(56) References Cited

U.S. PATENT DOCUMENTS

2015/0349917 A1* 12/2015 Skaaksrud ............ H04W 4/029
                                                    370/328
2019/0244448 A1*  8/2019 Alamin .............. G07C 9/00896

FOREIGN PATENT DOCUMENTS

| JP | 2009-284255 A | 12/2009 |
| JP | 2015-039098 A | 2/2015 |
| JP | 5891468 B1 | 3/2016 |

* cited by examiner

LOCATION POSITIONING SYSTEM

CROSS-REFERENCE TO RELATED APPLICATION(S)

This application claims priority to and the benefit of Japanese Patent Application Serial No. 2020-083139, filed May 11, 2020, the entire disclosure of which is hereby incorporated by reference.

TECHNICAL FIELD

The present invention relates to a location positioning system capable of transmitting a message to a subject by an appropriate method according to a situation of the subject while grasping a location of a subject to be watched over such as a child.

BACKGROUND

For example, a parent or guardian having a small child often has concerns about whether the child has arrived safely at school or a cram school without an accident or the like, and whether the child has come home safely at the time of coming home. For this reason, conventionally, various efforts have been made to ensure safety of the child, such as watching over a school route in cooperation with local residents and the like. However, due to a change in social environment such as an increase in double-income households and an aging of the population, it is difficult to watch over the child sufficiently. Under such circumstances, there is no end to the number of cases in which the child are taken away on way to or from school or involved in an incident, which has a tendency to increase in fact.

As a mechanism for coping with the problem as described above, for example, a service that enables confirmation of position information of the child using a GPS function mounted on a portable information terminal such as a smartphone is provided.

However, in the portable information terminal such as a smartphone, a terminal price, a communication fee, and the like are generally expensive, and it is considered that restriction of use due to educational reasons and the like is also necessary, and thus it is not realistic to cause each child to have the portable information terminal for the purpose of confirming the position information.

Furthermore, a position detection by the GPS function has a problem that an accuracy of a detected position is not sufficiently high. For example, there is a problem that the child is detected to be on a road outside the school or the like although the child is actually in the school, and a parent or guardian or the like who has confirmed the position of the child becomes anxious or uncomfortable.

Moreover, since the GPS function consumes a large amount of power, it is necessary to charge the smartphone or the like at least every several days when the position is always detected using the GPS function. In this case, for example, in a case where a user forgets charging, the position of the child cannot be confirmed during an emergency.

In order to cope with such a problem, a technique using a power-saving short-range wireless communication such as Bluetooth without using the GPS function has also been proposed. For example, the child is caused to carry a simple Bluetooth terminal that transmits only identification information, and the identification information transmitted from the Bluetooth terminal is read by a reading terminal located in a watching area such as the school route. Accordingly, it is possible to confirm that the child has passed the position of the reading terminal (for example, JP 5891468 B2).

According to such a method, since the short-range wireless communication is used, the accuracy of position detection is high, and since the GPS function is not used, it is not necessary to frequently charge the terminal carried by the child.

SUMMARY

However, a position detection technique as described above has a problem that it is difficult to convey a message to a child even when the position of the child can be detected. Thereupon, in a case where the message is notified to the terminal of the child in a certain way, it is necessary to ring an incoming call alarm of the message such that the child can immediately notice the message. However, for example, when the incoming call alarm for the message is sounded during a class of a school, it interferes with the class and thus it is difficult for the child to bring the terminal to school. In addition, it is cumbersome to switch on/off of ringing of a ringtone between a case where it is during class and a case where it is not during class, and it is not realistic particularly for a subject to be watched over such as a child. In this case, the school cannot actively introduce such a system.

The present invention has been made in view of the above circumstances. In other words, an object of the present invention is to provide a location positioning system that can notify a subject of the message by an appropriate method according to a situation of the subject while grasping the location of the subject to be watched over such as a child.

The above object is achieved by means below.

The location positioning system includes a subject terminal carried by the subject, a server, a judgement unit, and a determination unit. The subject terminal includes an output unit that transmits the identification information for specifying the position of the subject terminal via wireless communication, is capable of receiving delivery information directed to the subject, and notifies the subject of receiving the delivery information by at least one method of sound, light, display, and motion. The server specifies the position of the subject terminal based on the identification information transmitted from the subject terminal. The judgement unit judges whether the subject is present in a predetermined facility based on the position of the subject terminal specified by the server and map information stored in advance. The determination unit determines an output method in the output unit of the subject terminal according to a judgement result in the judgement unit.

Advantageous Effects of Invention

A location positioning system according to the present invention includes the subject terminal that notifies of receiving the delivery information directed to the subject by at least one method of the sound, light, display, and motion, and the server that specifies a position of the subject terminal. The location positioning system determines whether or not the subject is present in the predetermined facility based on the location of the subject terminal specified by the server and map information stored in advance, and determines the output method of a notification in the subject terminal according to the judgement result. Accordingly, this makes it possible to notify the subject of the message by an appropriate method according to the situation of the subject while grasping the location of the subject to be watched over such as the child.

DETAILED DESCRIPTION

Figure 1:
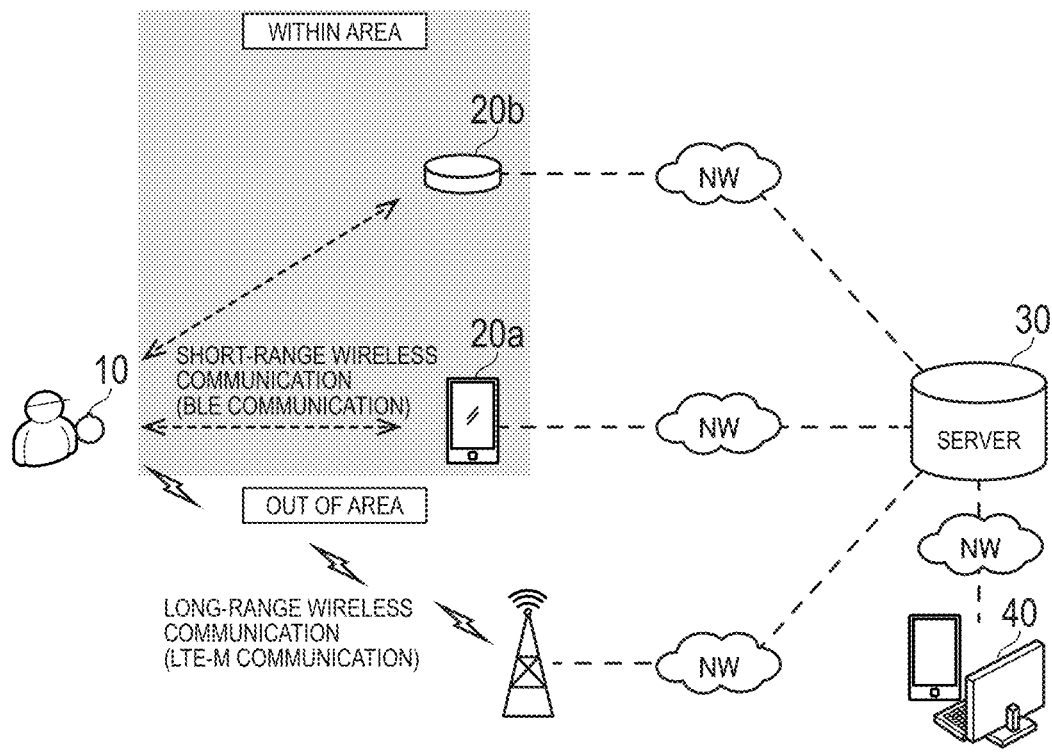
FIG. 1 is a diagram illustrating a schematic configuration of a location positioning system according to one embodiment of the present invention.

Hereinafter, embodiments of the present invention will be described with reference to the accompanying drawings. Furthermore, in the description of the drawings, the same elements are denoted by the same reference numerals, and redundant descriptions will be omitted. In addition, dimensional ratios in the drawings are exaggerated for convenience of description, and may be different from actual ratios.

<Configuration of Location Positioning System>

FIG. 1 is a diagram illustrating a schematic configuration of a location positioning system according to one embodiment of the present invention.

As illustrated in FIG. 1, the location positioning system includes subject terminals 10, detection terminals 20 (20a and 20b), a server 30, and a parent or guardian terminal 40. Hereinafter, the detection terminal 20a and the detection terminal 20b are collectively referred to as the detection terminals 20 unless otherwise distinguished.

The subject terminals 10 communicates with the detection terminals 20 (20a and 20b) via short-range wireless communication, and is connected to the server 30 via a network through a long-range wireless communication.

The detection terminals 20 (20a and 20b) communicate with the subject terminals 10 through short-range wireless communication, and is connected to the server 30 via the network through wired or wireless communication.

The server 30 is configured to be able to communicate with the subject terminals 10, the detection terminals 20 (20a and 20b), and the parent or guardian terminal 40 via the network.

The parent or guardian terminal 40 is connected to the server 30 via the network through the wired or wireless communication. Hereinafter, each configuration will be described in detail.

<Subject Terminals 10>

The subject terminals 10 are terminals carried by a subject to be watched over such as a child or an elderly person (hereinafter, also simply referred to as a "subject").

Figure 2:
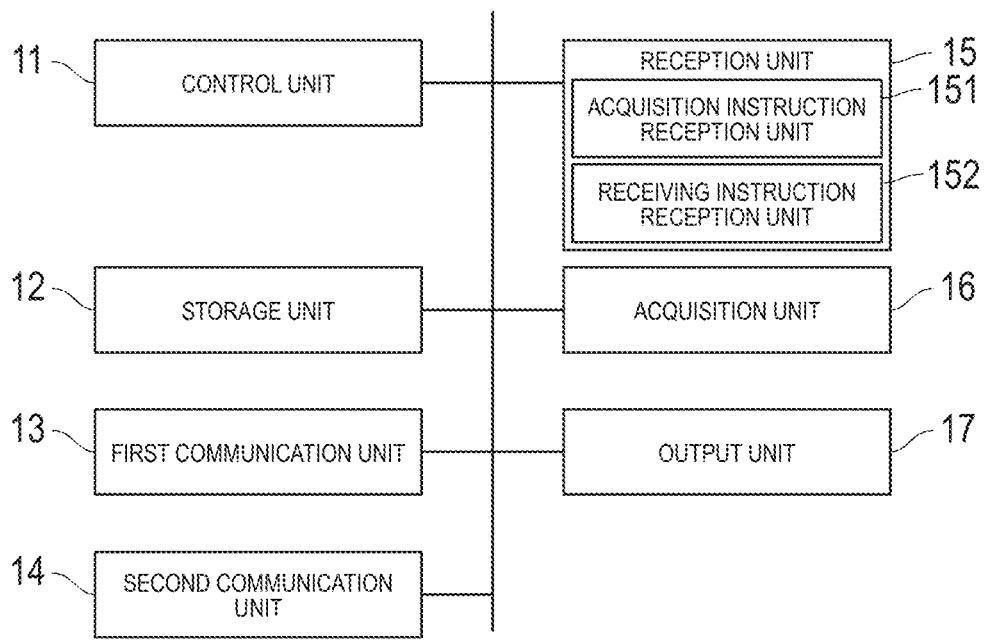
FIG. 2 is a block diagram illustrating a schematic configuration of a subject terminal.

FIG. 2 is a block diagram illustrating a schematic configuration of a subject terminal.

As illustrated in FIG. 2, the subject terminals 10 include a control unit 11, a storage unit 12, a first communication unit 13, a second communication unit 14, a reception unit 15, an acquisition unit 16, and an output unit 17. The components are communicably connected to each other via a bus.

The control unit 11 includes a CPU (Central Processing Unit), and executes a control of each component described above and various types of arithmetic processing according to a program.

The storage unit 12 stores a ROM (Read Only Memory) that stores various programs and data in advance, a RAM (Random Access Memory) that temporarily stores programs and data as a work area, and various programs and data.

Furthermore, the storage unit 12 stores the identification information for identifying the subject terminals 10, information indicating a first time interval that is a time interval at which the first communication unit 13 transmits the identification information, a second time interval that is a time interval at which the second communication unit 14 performs communication, and the like. Moreover, the storage unit 12 stores various types of information acquired by the acquisition unit 16.

The first communication unit 13 outputs a signal for performing the short-range wireless communication using, for example, a Bluetooth (a registered trademark) standard, and communicates with another terminal, device, or the like present in proximity through the short-range wireless communication. As the standard of short-range wireless communication, for example, Bluetooth 4.0 (also referred to as Bluetooth Low Energy or BLE) is used. This standard is suitably used in the present embodiment because it intends to achieve significant power saving instead of not pursuing a communication speed. The first communication unit 13 performs the short-range wireless communication at the first time interval that is a relatively short time interval of about several tens of milliseconds to several seconds, for example, and transmits the identification information for identifying the subject terminals 10 to surroundings thereof. The first time interval may be set to, for example, about 3 seconds.

The second communication unit 14 communicates with other terminals, devices, or the like through the long-range wireless communication provided by a mobile communication carrier or the like. As the standard of long-range wireless communication, for example, LTE-M (Long Term Evolution for Machine-type-communication) is used. This standard is one of low power wide area LPWA (Low Power Wide Area: wireless communication techniques that enable power saving and wide-area communication) utilizing existing LTE facility, and is suitably used in the present embodiment because power saving and improvement of communication stability are intended to achieve while a moderate communication speed is secured. In the present embodiment, the second communication unit 14 transmits the identification information for identifying the subject terminals 10 to the server 30 at the second time interval that is a relatively long time interval of, for example, several minutes to several hours. The second time interval can be arbitrarily set by the user, and for example, may be selected and set by the user from among selection candidates such as 5 minutes, 10 minutes, 30 minutes, 1 hour, 2 hours, and 12 hours. Furthermore, the second time interval may be set such that different values are used in a case where the subject terminals 10 are moving and a case where the subject terminal is stationary. For example, the second time interval during movement when the subject terminals 10 are moving may be set to 30 minutes, and the second time interval during stationary time when the subject terminals 10 are stationary may be set to 1 hour. Here, whether the subject terminals 10 are moving or stationary can be determined, for example, based on detection information of an acceleration sensor (not illustrated) provided in the subject terminals 10. Furthermore, the second time interval may be set to a different value according to stages of moving speeds of the subject terminals 10. For example, different values may be set to be used according to the stages of the moving speeds when the moving speeds of the subject terminals 10 are low (0 km/h to 4 km/h), medium (4 km/h to 10 km/h), high (10 km/h to higher), or the like. The stages of the moving speeds are not limited to the above example, and various numbers and ranges of stages can be set.

Furthermore, the second communication unit 14 has the GPS function of receiving the signal from a GPS satellite and acquiring the position information based on the received signal. When transmitting the identification information for identifying the subject terminals 10 to the server 30 as described above, the second communication unit 14 activates the GPS function to acquire the position information, and transmits the acquired position information to the server 30 together with the identification information. As described above, the second communication unit 14 performs the long-range wireless communication and position information acquisition by the GPS function at relatively long time intervals of about 1 hour in addition to using the long-range wireless communication technique for power saving, and thus, further power saving is realized.

The reception unit 15 is configured to receive an instruction from the subject or the like, and includes, for example, a push button, a button on a touch panel, or the like. In the present embodiment, the reception unit 15 includes an acquisition instruction reception unit 151 that receives an acquisition instruction for acquiring the subject information indicating a voice message of the subject, a surrounding voice, or the like, and a receiving instruction reception unit 152 that accepts a receiving instruction for receiving the delivery information delivered from the server 30 to the subject. Furthermore, the reception unit 15 may receive the acquisition instruction when an abnormal motion such as falling or a sudden speed change of the subject is detected based on outputs of various sensors (not illustrated) such as the acceleration sensor provided in the subject terminals 10 to detect the motions of the subject terminals 10. In addition, the reception unit 15 may receive the acquisition instruction when an emergency flag to be described later is acquired from the server 30. Furthermore, the reception unit 15 may receive the acquisition instruction and the receiving instruction via the voice acquired by a microphone or the like, or may receive the acquisition instruction and the receiving instruction via an image (including a video) acquired by a camera or the like. Moreover, the acquisition instruction reception unit 151 and the receiving instruction reception unit 152 of reception unit 15 may be mounted in association with different buttons, or may be mounted in association with different operation methods such as a short pressing one, a long pressing one, and a continuous pressing one of one button. In addition, the acquisition instruction reception unit 151 can be used at any timing desired by the subject, such as a timing when a certain emergency situation occurs in the subject.

The acquisition unit 16 is a configuration for acquiring a voice and an image (video) around the subject terminals 10, and includes a microphone, a camera, and the like. For example, when the acquisition instruction reception unit 151 receives an instruction from the subject, the acquisition unit 16 acquires surrounding voice or image (a video) and stores the acquired voice or image as the subject information. For example, after the instruction to acquire the subject information is received, the acquisition unit 16 may repeatedly record the surrounding voice or image (the video) at predetermined intervals. Accordingly, it is possible to effectively grasp the subject and the surrounding situation while suppressing the amount of power consumed. The control unit 11 stores information indicating the voice or the image (the video) acquired by the acquisition unit 16 in the storage unit 12 and transmits the information to the server 30 via the second communication unit 14. Furthermore, the control unit 11 controls the second communication unit 14 to acquire the position information by the GPS function, and transmits the identification information and the position information of the subject terminals 10 to the server 30.

The output unit 17 includes a sound output unit (not illustrated) that outputs a sound, a light output unit (not illustrated) that outputs a light, an image output unit (not illustrated) that outputs an image, an operation output unit (not illustrated) that generates a movement such as vibration, and the like, and notifies the subject of reception of the delivery information. Furthermore, the output unit 17 outputs the delivery information received from the server 30. The sound output unit is, for example, a sound output interface such as a speaker or an earphone jack. The light output unit is, for example, a light source such as an LED. The image output unit is, for example, a video output interface such as a liquid crystal display or a video output terminal. The operation output unit is, for example, a vibration motor that generates vibration. When the notification in the output unit 17 is confirmed, the subject can reliably and easily acquire and confirm the delivery information stored in the server 30 only by operating the receiving instruction reception unit 152.

In the present embodiment, the control units 11 of the subject terminals 10 function as a determination unit, and determine a method of output by the output unit 17 according to the judgement result in the judgement unit (details will be described later) of the server 30.

Since the subject terminals 10 in the present embodiment attempts to achieve power saving as described above with respect to the wireless communication with high power consumption, for example, in a case where a small secondary battery such as a rechargeable lithium ion battery is used, the subject terminal can operate without charging for about one month, and can operate for about several months to one year without charging depending on setting content and use situation.

<Detection Terminals 20 (20*a* and 20*b*)>

The detection terminals 20 is a terminal that is present in an area including the watching area of the subject and detects the subject terminals 10 communicable through the short-range wireless communication. The detection terminal 20*a* is a fixed terminal installed at a predetermined position included in the watching area, and the detection terminal 20*b* is a mobile terminal provided on a person, a vehicle, or the like that is a mobile body moving in an area including the watching area. Examples of the vehicle described above include various vehicles such as a private car, a taxi, a bus, and a train. For example, the detection terminals 20 may be configured by installing a dedicated application in a general-purpose information terminal such as a smartphone or a tablet PC, or may be configured as a dedicated terminal having the following minimum configuration.

Figure 3:
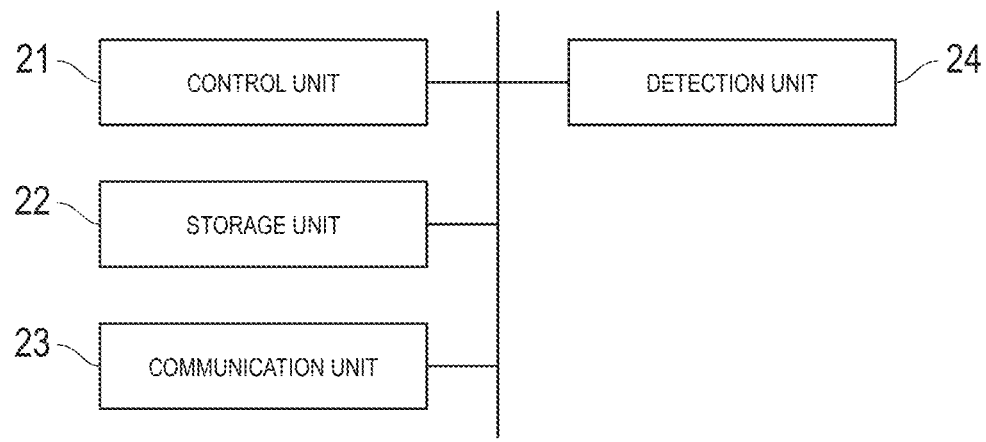
FIG. 3 is a block diagram illustrating a schematic configuration of a detection terminal.

FIG. 3 is a block diagram illustrating a schematic configuration of the detection terminal.

As illustrated in FIG. 3, the detection terminals 20 includes a control unit 21, a storage unit 22, a communication unit 23, and a detection unit 24. The components are communicably connected to each other via the bus. Since the control unit 21 and the storage unit 22 of the detection terminals 20 have the same configurations as the control unit 11 and the storage unit 12 of the subject terminals 10, respectively, redundant descriptions will be omitted.

The communication unit 23 is a configuration for communicating with other terminals, devices, and the like via the network. The communication unit 23 transmits and receives various types of information to and from the server 30, for example.

The detection unit 24 is configured to detect the subject terminals 10 communicable through the short-range wireless communication such as Bluetooth described above. As described above, the subject terminals 10 perform the communication through the short-range wireless communication by the first communication unit 13. For example, when receiving the identification information transmitted by the first communication unit 13 of the subject terminals 10, the detection unit 24 can detect the subject terminals 10 as the communicable subject terminals 10.

When the subject terminals 10 are detected by the detection unit 24, the control unit 21 transmits the identification information of the subject terminals 10 to the server 30 as a transmission unit.

Since the detection terminal 20*a* is a fixed terminal, the information regarding the position of each detection terminal 20*a* is stored in advance in the storage unit 32 of the server 30 in association with the information for identifying the detection terminal 20*a*. When transmitting the identification information of the subject terminals 10 detected by the detection unit 24 to the server 30, the detection terminal 20*a* also transmits the information for identifying the detection terminal 20*a* to the server 30. Accordingly, when receiving the identification information of the subject terminals 10 from the detection terminal 20*a*, the server 30 can acquire the information related to the position of the detection terminal 20*a* from the storage unit 32 using the information for identifying the detection terminal 20*a* that has been received together.

On the other hand, since the detection terminal 20*b* is the mobile terminal, the information regarding the position of each detection terminal 20*b* is acquired based on the signal from the GPS satellite by the GPS function of each detection terminal 20*b*. When transmitting the identification information of the subject terminals 10 detected by the detection unit 24 to the server 30, the detection terminal 20*b* transmits the information indicating the position of the detection terminal 20*b* together. Accordingly, when receiving the identification information of the subject terminals 10 from the detection terminal 20*b*, the server 30 can acquire the information indicating the position of the detection terminal 20*b* based on the information received together.

For example, in a case where the detection terminal 20*b*, which is the mobile terminal, is configured by a smartphone, a tablet PC, or the like, the detection terminal further has a configuration of a general information terminal such as an operation unit and a display unit (a touch panel display or the like). In this case, the detection terminal 20*b* can also be used as the parent or guardian terminal 40 to be described later.

<Server 30>

The server 30 is, for example, an information processing device operated by a provider of a service that specifies and notifies of the position information.

Figure 4:
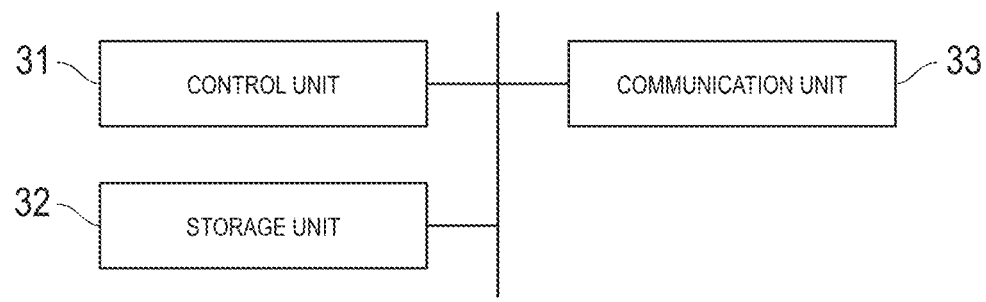
FIG. 4 is a block diagram illustrating a schematic configuration of a server.

FIG. 4 is a block diagram illustrating a schematic configuration of the server.

As illustrated in FIG. 4, the server 30 includes a control unit 31, a storage unit 32, and a communication unit 33. The components are communicably connected to each other via the bus. The configurations of the control unit 31, the storage unit 32, and the communication unit 33 of the server 30 are the same as those of the control unit 21, the storage unit 22, and the communication unit 23 of the detection terminal 20, respectively, and thus redundant descriptions will be omitted.

The control unit 31 reads the program and executes the process, thereby executing the processing of specifying the positions of the subject terminals 10 based on the identification information transmitted from the subject terminals 10. For example, the server 30 specifies the positions of the subject terminals 10 based on the identification information and the position information transmitted from the subject terminals 10. Alternatively, the server 30 specifies the positions of the subject terminals 10 based on the identification information transmitted from the detection terminals 20 and the information related to the position of the detection terminal 20. Furthermore, the control unit 31 outputs the information related to the specified positions of the subject terminals 10. The control unit 31 may output the information regarding the position by coordinate information such as two-dimensional or three-dimensional one, or may convert the coordinate information into an address, an area name, or the like according to a predetermined rule and output the converted information as an address or an area name. In addition, the control unit 31 outputs the information associated with the positions of the subject terminals 10 such that the display corresponding to the subject information recorded at the position is visualized.

Furthermore, the control unit 31 functions as the judgement unit, a receiving unit, a setting unit, and a transmission unit.

The judgement unit determines whether the subject is present in the predetermined facility based on the specified positions of the subject terminals 10 and the map information stored in advance. Furthermore, in a case where the subject is present in the facility, the judgement unit determines whether or not the subject is participating in a lesson or an event held in the facility in consideration of the information regarding a schedule of the facility and time information stored in advance. In addition, when the subject is present in the facility, the judgement unit judges whether or not the subject is utilizing transportation facilities in consideration of the information regarding the moving speeds or acceleration of the subject terminals 10 acquired from the subject terminals 10.

The receiving unit receives the delivery information to be delivered to the subject terminals 10.

The setting unit sets a delivery flag when the delivery information is received by the receiving unit.

The transmission unit transmits the delivery information to the subject terminals 10.

Furthermore, the control unit 31 may set the emergency flag indicating an occurrence of the emergency situation regarding the subject who holds the subject terminals 10. For example, in a case where the specified positions of the subject terminals 10 is included in a predetermined range in the watching area, the control unit 31 sets the emergency flag for the subject terminals 10. Moreover, in a case where the specified positions of the subject terminals 10 is outside the watching area, the control unit 31 sets the emergency flag for the subject terminals 10. In addition, in a case where the identification information transmitted from the first communication unit 13 of the subject terminals 10 is not acquired for a predetermined time, the control unit 31 sets the emergency flag for the subject terminals 10.

The storage unit 32 stores, as information regarding the subject and the subject terminals 10, the identification information of the subject terminals 10, attribute information such as a name and an age of the subject who holds the subject terminals 10, attribute information such as a name and a contact address of a parent or guardian of the subject, and the like in association with each other.

Furthermore, the storage unit 32 stores, as the information regarding the detection terminal 20, the identification information of the detection terminal 20, the attribute information indicating whether the detection terminals 20 are the fixed terminals or the mobile terminals, and the like, and in a case where the detection terminal is the fixed terminal, the information regarding the position of the detection terminals 20 and the like in association with each other.

Moreover, the storage unit 32 stores map information including information regarding the positions of facilities such as buildings, institutions, and transportation facilities in the range where the subject terminals 10 moves. The facilities include, for example, schools, cram schools, classes for various kinds of lessons (including sports practice places and the like), event venue such as movie theaters and concert halls, and transportation facilities such as trains and buses.

Furthermore, the storage unit 32 stores information regarding the schedule in the facility as described above. For example, in the case of a school or a classroom, information regarding school attendance time (start and end time) and a time schedule (a schedule of lessons) is stored. In a case of a movie theater or a concert venue, information regarding starting time and ending time of a movie or a concert is stored. In a case of transportation facilities such as a train or a bus, information regarding operation time is stored.

Furthermore, the storage unit 32 also stores a time setting flag for setting the second time interval of the subject terminals 10, flag information regarding the emergency flag, the delivery flag, and the like, information regarding the range of the watching area for setting various flags, and the like. The range of the watching area may be defined by a range of coordinate information such as two-dimensional or three-dimensional one, or may be defined by an address, an area name, or the like corresponding to the range of coordinate information. Furthermore, the storage unit 32 also stores information regarding the predetermined range that is assumed to be easily outside the watching area within the watching area, information regarding an environment of each area in the watching area, information regarding a risk level according to the environment, information regarding a risk level according to a time zone of each area, and the like. In addition, the storage unit 32 also stores the values of the second time interval set for each of the subject terminals 10 according to specific situations of the positions of the subject terminals 10, the moving situations, the moving speeds, the environment of the area where the subject terminals 10 are located, the time zone, and the like.

<Parent or Guardian Terminal 40>

The parent or guardian terminal 40 is a terminal used by a parent or guardian who protects and manages the subject. The parent or guardian terminal 40 receives a notification from the server 30 and notifies the parent or guardian of the notification, or accesses the server 30 and acquires and displays the subject information and information regarding the position of the subject stored in the server 30.

Figure 5:
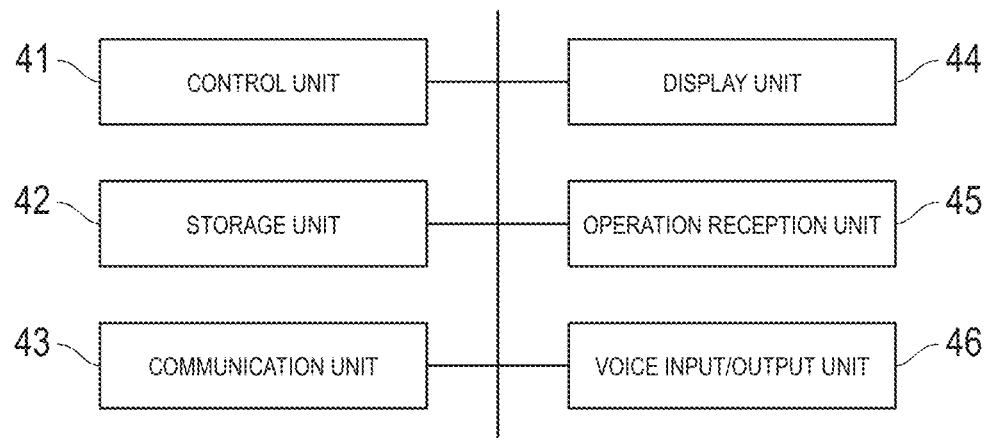
FIG. 5 is a block diagram illustrating a schematic configuration of a parent or guardian terminal.

FIG. 5 is a block diagram illustrating a schematic configuration of a parent or guardian terminal.

As illustrated in FIG. 5, the parent or guardian terminal 40 includes a control unit 41, a storage unit 42, a communication unit 43, a display unit 44, an operation reception unit 45, and a voice input/output unit 46. The components are communicably connected to each other via the bus. Since the configurations of the control unit 41, the storage unit 42, and the communication unit 43 of the parent or guardian terminal 40 are similar to those of the control unit 21, the storage unit 22, and the communication unit 23 of the detection terminal 20, respectively, the descriptions thereof will be omitted.

The display unit 44 includes an LCD (liquid crystal display), an organic EL display, and the like, and displays various types of information.

The operation reception unit 45 includes a touch sensor, pointing devices such as a mouse, a keyboard, and the like, and receives various operations of the user. The display unit 44 and the operation reception unit 45 may constitute the touch panel by superimposing the touch sensor as the operation reception unit 45 on a display surface as the display unit 44. For example, the operation reception unit 45 receives an instruction from the parent or guardian to acquire the subject information from the server 30 and output the subject information.

The voice input/output unit 46 includes a microphone, a voice input terminal, or the like for inputting a voice, a speaker, a voice output terminal, or the like for outputting the voice. For example, the voice input/output unit 46 outputs the voice corresponding to the subject information acquired from the server 30 and receives an input of the delivery information to be delivered to the subject.

In addition, each of the subject terminals 10, the detection terminals 20, the server 30, and the parent or guardian terminal 40 may include components other than the components described above, or may not include some of the components described above.

<Outline of Processing>

Next, a flow of processing in the location positioning system will be described.

<Location Positioning Processing>

Figure 6:
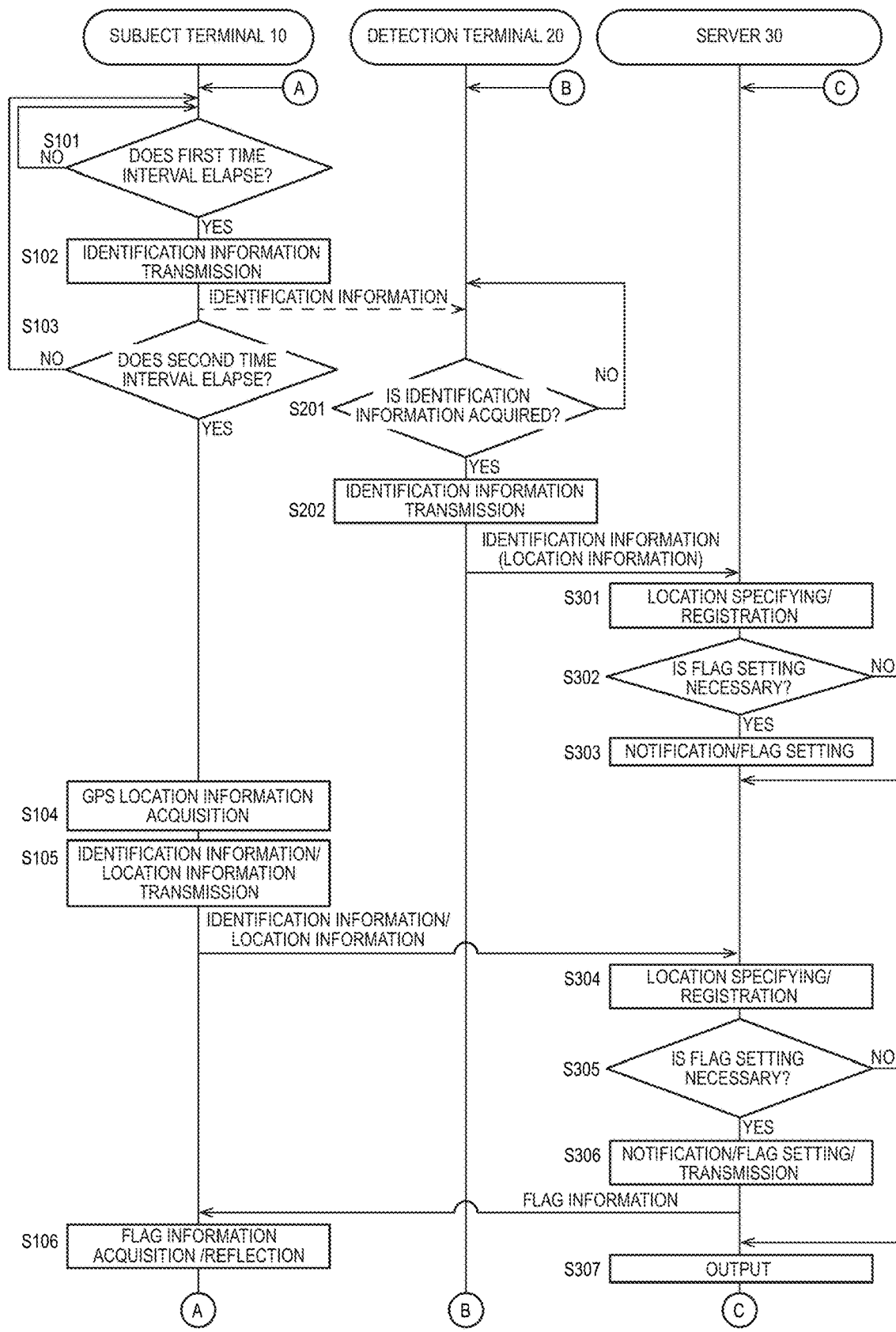
FIG. 6 is a sequence chart illustrating a flow of location positioning processing executed in the location positioning system.
Figure 7A:
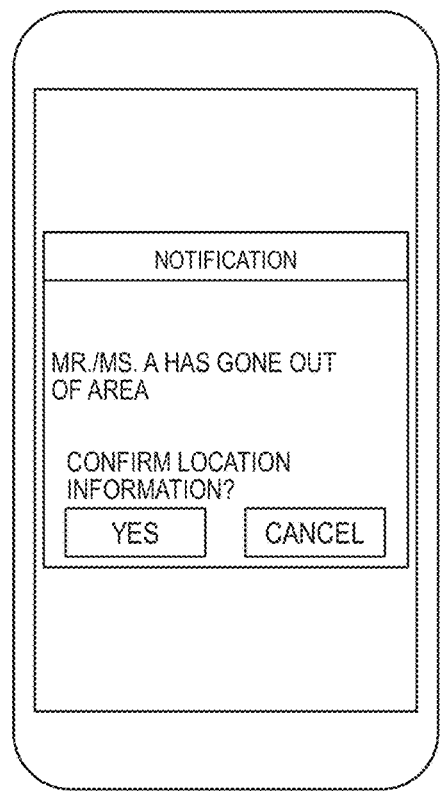
FIGS. 7A-7C are diagrams showing an example of a screen displayed on the parent or guardian terminal.
Figure 7B:
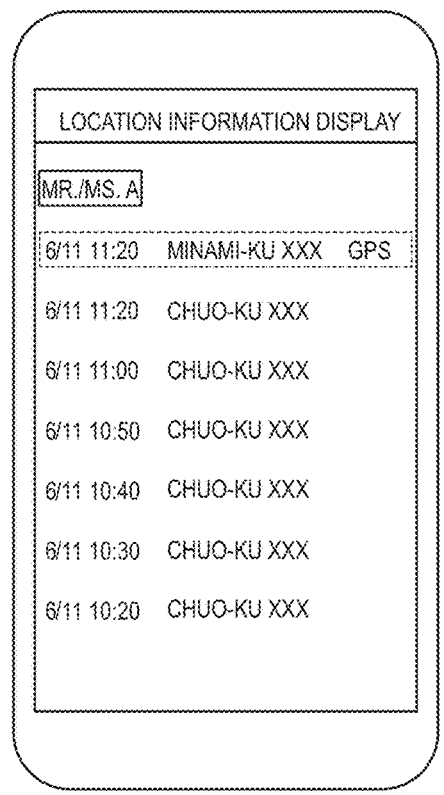
Figure 7C:
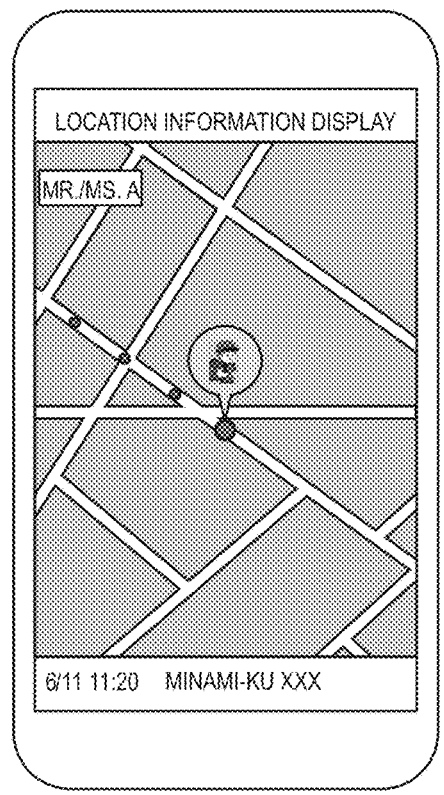

FIG. 6 is a sequence chart illustrating a flow of processing executed in the location positioning system. FIGS. 7A-7C are diagrams illustrating an example of a screen displayed on the parent or guardian terminal.

To start with, processing of the subject terminals 10 will be described.

As shown in FIG. 6, the subject terminals 10 determine whether or not the first time interval has elapsed (step S101). When the first time interval has not elapsed (step S101: NO), the subject terminals 10 wait until the first time interval elapses.

In a case where the first time interval has elapsed (step S101: YES), the subject terminals 10 output the signal for performing the short-range wireless communication by the first communication unit 13, and transmits the identification information for identifying the subject terminals 10 to the surroundings through the short-range wireless communication (step S102). Since a relatively short time interval of about 3 seconds is set as the first time interval, the subject terminals 10 becomes a state to constantly transmit the identification information in a short cycle. As the first time interval, a constant value may be set as a fixed value, or a variable value may be set. Furthermore, the first communication unit 13 may output a radio wave for performing the short-range wireless communication at the first time interval, and transmit the identification information to the other party when communication with the other party is established. Alternatively, the first communication unit 13 may transmit the identification information at the first time interval regardless of whether the communication with the other party is established.

Subsequently, the subject terminals 10 determine whether or not the second time interval has elapsed (step S103). When the second time interval has not elapsed (step S103: NO), the subject terminals 10 return to the processing of step S101 and repeats the processing of performing the short-range wireless communication.

When the second time interval has elapsed (step S103: YES), the subject terminals 10 acquire the position information of the subject terminals 10 based on the signal from the GPS satellite by the second communication unit 14 using a known technique (step S104). Then, the subject terminals 10 transmit the position information of the subject terminals 10 acquired in the processing of step S104 and the identification information for identifying the subject terminals 10 to the server 30 through the long-range wireless communication (step S105). Since a relatively long time interval of about 1 hour is set as the second time interval, the subject terminals 10 transmit the identification information through the short-range wireless communication in the short cycle as described above, and transmit the identification information and the position information by the GPS function to the server 30 through the long-range wireless communication in a long cycle such as every hour. In addition, as described above, in a case where the values corresponding to moving states and the moving speeds of the subject terminals 10 are set as the second time interval, the subject terminals 10 use the second time interval corresponding to the moving states and the moving speeds of a host device determined from the detection information of the acceleration sensor or the like.

Subsequently, when the time setting flag information for changing the second time interval is acquired from the server 30 when communicating with the server 30 in the processing of step S105, the subject terminals 10 change the second time interval based on the content of the flag information (step S106). Furthermore, when the subject terminals 10 have acquired the emergency flag or the delivery flag when communicating with the server 30 in the processing of step S105, the subject terminals 10 execute a processing corresponding to each flag to be described later.

The subject terminals 10 repeatedly execute the processing of steps S101 to S106.

Next, the processing of the detection terminals 20 will be described.

The detection terminals 20 detect the communicable subject terminals 10 and determine whether or not the identification information is acquired from the subject terminals 10 (step S201). When the identification information has not been acquired (step S201: NO), the detection terminals 20 continues the processing for detecting the subject terminals 10 and acquiring the identification information until the identification information can be acquired.

When the identification information is acquired (step S201: YES), the detection terminals 20 transmit the acquired identification information to the server 30 (step S202).

Here, when the detection terminals 20 are fixed terminals (the detection terminal 20a), the detection terminal 20a transmits the information for identifying the detection terminal 20a to the server 30 together with the identification information. This is because the information regarding the position of each detection terminal 20a is stored in advance in the storage unit 32 of the server 30 in association with the information for identifying the detection terminals 20a. Accordingly, when receiving the identification information of the subject terminals 10 from the detection terminal 20a, the server 30 can acquire the information related to the position of the detection terminal 20a from the storage unit 32 using the information for identifying the detection terminal 20a that has been received together.

On the other hand, when the detection terminals 20 are mobile terminals (the detection terminals 20b), the detection terminal 20b acquires information regarding the position of each detection terminal 20b based on the signal from the GPS satellite using the GPS function, and transmits the information to the server 30 together with the identification information. Accordingly, when receiving the identification information of the subject terminals 10 from the detection terminal 20b, the server 30 can acquire the information indicating the position of the detection terminal 20b based on the information received together.

The detection terminals 20 repeatedly execute the processing of steps S201 to S202.

Next, the processing of the server 30 will be described.

The server 30 receives the identification information of the subject terminals 10 from the detection terminals 20, acquires the information regarding the position of the detection terminals 20 as described above, and specifies the positions of the subject terminals 10 corresponding to the identification information based on the acquired information (step S301). The server 30 registers the identification information of the subject terminals 10 and the specified position in the storage unit 32 in association with each other.

Subsequently, the server 30 determines whether or not setting of various flags is necessary based on the specific situations of the positions of the subject terminals 10 in the processing of step S301 (step S302). For example, the server 30 determines whether or not it is necessary to change the frequency of position information acquisition using the GPS function, that is, the second time interval based on the specific situation of the positions of the subject terminals 10, and determines whether or not it is necessary to set the time setting flag. Furthermore, the server 30 determines whether or not it is necessary to set the emergency flag based on the specific situation of the positions of the subject terminals 10. In addition, the server 30 may individually determine whether or not it is necessary to set the time setting flag and the emergency flag based on independent conditions.

For example, when the specified positions of the subject terminals 10 are included in the predetermined range in the preset watching area, the server 30 determines that it is necessary to set the time setting flag and the emergency flag of the subject terminals 10. Furthermore, different areas can be set for the predetermined range for setting the time setting flag and the predetermined range for setting the emergency flag. For example, the predetermined range for setting the time setting flag is a peripheral region of the watching area where the subject terminals 10 are expected to go out of the watching area, a station or a bus stop where the subject terminals can get on and off transportation facilities such as a train or a bus that can moves a long distance, or a region including a track, a bus road, or the like through which the train or the bus passes. In addition, the predetermined range for setting the time setting flag and the emergency flag is, for example, an area in which it is determined that the risk level is high from the attributes (a residential area, an office area, a shopping street, a nightlife street, and the like), a security level, a traffic volume level, a quality level of watching (a solidity of the detection terminals 20a and 20b), an incident/accident occurrence level, a suspicious person information occurrence level, a disaster occurrence level, and the like of the area. The risk level for each area can be dynamically changed. For example, in a case where an incident, an accident, or a disaster occurs, an arbitrary range can be set to an area having a high risk level as an incident/accident occurrence area or a disaster occurrence area.

In addition, the server 30 may determine that it is necessary to change the second time interval of the subject terminals 10 to be short when it is determined that the subject terminals 10 move from a predetermined range such as a peripheral edge portion in the watching area toward the outside of the watching area based on a transition of the specified positions of the subject terminals 10. This is because there is a high possibility that the subject terminals 10 will go out of the watching area from now.

Furthermore, the server 30 may determine an area including the position based on the specified positions of the subject terminals 10, acquire the values of the second time interval set in advance according to the environment of the area, and determine that it is necessary to change the second time interval of the subject terminals 10 when the acquired value is different from the values used in the subject terminals 10. As the environment of the area, for example, attributes (the residential area, the office area, the shopping street, the nightlife street, and the like), the security level, the traffic volume level, the quality level of watching (the solidity of the detection terminals 20a and 20b), the incident/accident occurrence level, the suspicious person information occurrence level, the disaster occurrence level, and the like of the area are set, and the second time interval can be set for each subject terminal 10 according to the environment of the area. Furthermore, the attributes of the area can be dynamically changed. For example, in a case where an incident/accident, or a disaster occurs, an arbitrary range can be set as an incident/accident occurrence area or a disaster occurrence area.

In addition, the server 30 may determine an area including the position based on the specified positions of the subject terminals 10, acquire the values of the second time interval set in advance according to the time zone for the area, and determine that it is necessary to change the second time interval of the subject terminals 10 when the acquired values are different from the values used in the subject terminals 10. For example, from a viewpoint of the security level, the traffic volume level, a watching solidity level, and the like, the second time interval in a daytime time zone can be set to be long and the second time interval in a nighttime time zone can be set to be short for an area in which it is relatively safe in the daytime but the risk is high at night.

Furthermore, when the identification information transmitted from the first communication unit 13 of the subject terminals 10 is not acquired for the predetermined time, the server 30 may determine that it is necessary to set the time setting flag and the emergency flag of the subject terminals 10 corresponding to the identification information.

Moreover, the server 30 may set the time setting flag and the emergency flag of the subject terminals 10 when the subject terminals 10 move from the predetermined range in the watching area to a range other than the predetermined range in the watching area based on the transition of the specified positions of the subject terminals 10.

In addition, the server 30 may execute a plurality of various determination methods as described above in combination.

When it is determined that there is no need to set various flags (step S302: NO), the server 30 proceeds to the processing of step S304 or step S301. The server 30 returns to the processing of step S301 when receiving the identification information from the detection terminal 20, and proceeds to the processing of step S304 when receiving the identification information from the subject terminals 10.

In a case where it is determined that it is necessary to set various flags (step S302: YES), the server 30 notifies the parent or guardian terminal 40 associated in advance with the subject terminals 10, and sets the time setting flag and the emergency flag of the subject terminals 10 (step S303). By setting the time setting flag and the emergency flag as described above, when the subject terminals 10 communicate with the server 30 by the second communication unit 14, each of the flags described above can be acquired, and the corresponding processing can be executed based on the content of the acquired flag.

Here, the notification to the parent or guardian terminal 40 is executed, for example, by displaying a notification screen as illustrated in FIG. 7A on the display unit 44 of the parent or guardian terminal 40. Alternatively, the notification to the parent or guardian terminal 40 may be executed by transmitting a message to an electronic mail address registered in advance or an account such as various messaging applications or SNS services.

For example, when the "YES" button is pressed on the screen illustrated in FIG. 7A, the server 30 transmits the position information of the corresponding subject to the parent or guardian terminal 40 (corresponding to the processing of step S307 to be described later). Accordingly, for example, a location information display screen as illustrated in FIG. 7B is displayed on the display unit 44 of the parent or guardian terminal 40.

In the screen of FIG. 7B, the transition of the position information of "Mr./Ms. A" who is the subject is displayed in time series from a lower side to an upper side of the screen. This screen indicates that it is detected from the GPS information that Mr./Ms. A, who was located in "chuo-ku", which is the watching area, from 9:00 AM to 11:00 AM, is located in "minami-ku", which is outside the watching area, at 11:20 AM. Furthermore, when the display of each record indicating the position information is pressed on the screen of FIG. 7B, the detailed location information including the map information may be displayed as illustrated in the screen of FIG. 7C. Moreover, a display order and display contents of the screen are not limited to the above examples, and the location information of the subject can be displayed via various methods. For example, when the "YES" button is pressed on the screen in FIG. 7A, the screen in FIG. 7C may be displayed, and the screen in FIG. 7B may be displayed by performing a predetermined operation such as pressing of a history button.

In addition, the server 30 specifies the positions of the subject terminals 10 corresponding to the identification information based on the identification information and the position information transmitted from the second communication unit 14 of the subject terminals 10 (step S304). The server 30 registers the identification information of the subject terminals 10 and the specified position in the storage unit 32 in association with each other.

Subsequently, the server 30 determines whether or not it is necessary to set various flags based on the specific situation of the positions of the subject terminals 10 in the processing of step S304 (step S305).

For example, the server 30 determines whether or not it is necessary to set various flags through a method similar to the processing of step S302 described above based on the specified positions of the subject terminals 10 in the processing of step S304.

Furthermore, when the specified positions of the subject terminals in the processing of step S304 are outside the watching area, the server 30 may determine that it is necessary to set various flags of the subject terminals 10.

When it is determined that there is no need to set various flags (step S305: NO), the server 30 proceeds to the processing of step S307.

When it is determined that there is need to set various flags (step S305: YES), the server 30 notifies the parent or guardian terminal 40 associated in advance with the subject terminals 10, sets the time setting flag and the emergency flag of the subject terminals 10, and transmits the time setting flag to the subject terminals 10 (step S306). Accordingly, the subject terminals 10 can acquire each flag described above and execute corresponding processing based on the contents of the acquired flags.

Subsequently, the server 30 outputs the information registered in the processing of step S301 and step S304, the information notified in the processing of step S303 and step S306, and the like in a browsable manner on the parent or guardian terminal 40 (step S307). This output processing can be executed at an arbitrary timing based on a request or the like from the parent or guardian terminal 40.

In addition, in the sequence chart of FIG. 6, the description has been given assuming that the server 30 receives the identification information directly from the subject terminals 10 after receiving the identification information of the subject terminal 10 via the detection terminal 20, but actually executes the processing of step S301 when receiving the identification information from the detection terminals 20 and executes the processing of step S304 when receiving the identification information from the subject terminals 10. Furthermore, in an actual use environment of the present system, it is assumed that a plurality of subject terminals 10 and a plurality of detection terminals 20 are provided, and the server 30 executes the processing as described above for each of the plurality of subject terminals 10 and the plurality of detection terminals 20.

<Subject Information Transmission Processing>

When the acquisition instruction is received by the acquisition instruction reception unit 151 of the subject terminals 10, regardless of the processing flow of the sequence chart of FIG. 6, the subject terminals 10 execute the processing of steps S104 and S105, acquires the position information using the GPS function, and transmits a notification indicating the occurrence of the emergency situation including the identification information and the position information to the server 30. At that time, the subject terminals 10 can acquire a voice and an image (a video) around the subject terminals 10 by the acquisition unit 16 and transmit information indicating the voice and the image (the video) to the server 30.

Furthermore, the instruction related to the occurrence of the emergency situation described above is not limited to the form of being received by the acquisition instruction reception unit 151 of the subject terminals 10, and may be received by setting the emergency flag indicating the occurrence of the emergency situation in the server 30. In this case, when the subject terminals 10 periodically communicate with the server 30 and acquires the emergency flag, an instruction for notifying of the occurrence of the emergency situation is received in the subject terminals 10, and the processing of acquiring the position information using the GPS function and transmitting the position information to the server 30 or the like is executed.

Hereinafter, the information acquisition processing will be described in detail.

Figure 8:
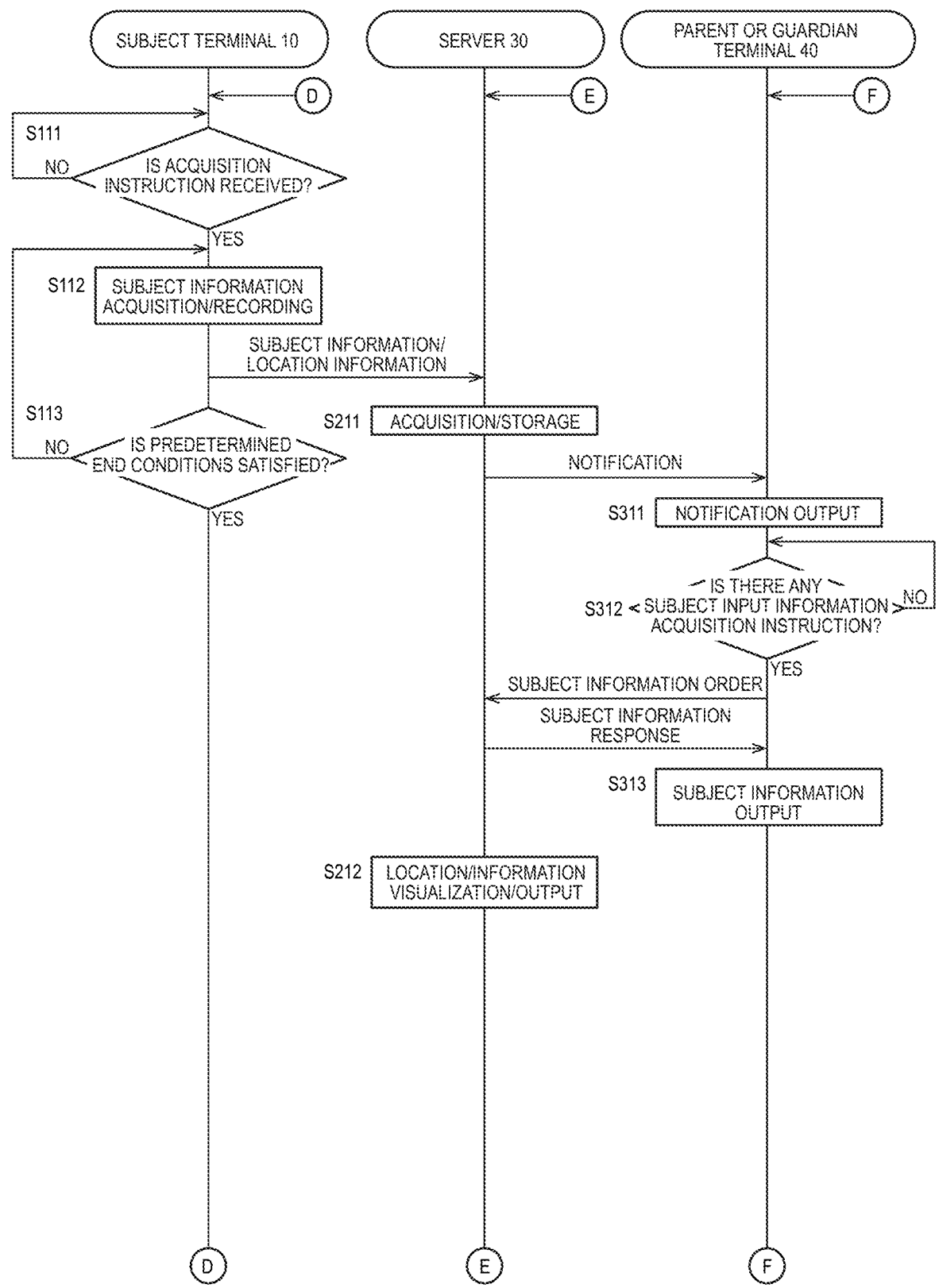
FIG. 8 is a sequence chart illustrating a flow of subject information transmission processing executed in the location positioning system.
Figure 9:
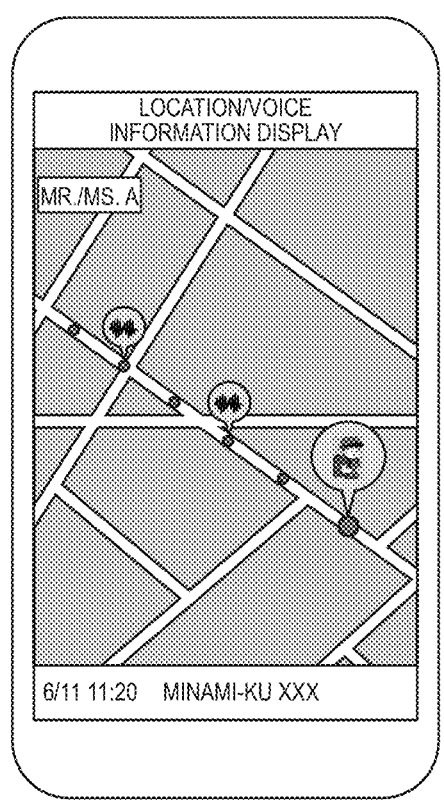
FIG. 9 is a diagram illustrating an example of a screen in which a position of a subject terminal and a display corresponding to the subject information recorded at the position are visualized in association with each other.

FIG. 8 is a sequence chart illustrating a flow of subject information transmission processing executed in the location positioning system. FIG. 9 is a diagram illustrating an example of a screen in which the positions of the subject terminal and the display corresponding to the subject information recorded at the positions are visualized in association with each other.

To start with, processing of the subject terminals 10 will be described.

As shown in FIG. 8, the subject terminals 10 determine whether or not an acquisition instruction has been received (step S111). As described above, the subject terminals 10 receive the acquisition instruction by receiving the instruction in the acquisition instruction reception unit 151, detecting the abnormal motion of the subject based on the outputs of the various sensors, acquiring the emergency flag set based on the position information of the subject terminals 10, and the like.

When the acquisition instruction has not been received (step S111: NO), the subject terminals 10 wait until the acquisition instruction is received.

When the acquisition instruction is received (step S111: YES), the subject terminals 10 record the surrounding voice as the subject information for a predetermined time at predetermined intervals (step S112). Furthermore, the subject terminals 10 transmit the recorded subject information to the server 30. The subject terminals 10 may acquire the position information of the subject terminals 10 when the subject information is recorded and transmit the position information to the server 30 together with the subject information.

The subject terminals 10 determine whether or not a predetermined end condition is satisfied (step S113). When the end condition is not satisfied (step S113: NO), the processing of step S112 is repeated. When the end condition is satisfied (step S113: YES), the processing is ended, and the processing returns to the processing of step S111. As the end condition, for example, a predetermined operation in the subject terminals 10, an emergency flag release of the server 30, or the like can be set.

Next, processing of the server 30 and the parent or guardian terminal 40 will be described.

The server 30 acquires various types of information transmitted from the subject terminals 10 and stores the information in the storage unit 32 (step S211). In addition, the server 30 notifies the parent or guardian terminal 40 that the subject information has been acquired from the subject terminals 10.

The parent or guardian terminal 40 outputs the notification transmitted from the server 30 via the display unit 44 or the voice input/output unit 46 (step S311).

The parent or guardian terminal 40 determines whether or not an instruction for acquiring a subject voice is received (step S312). The instruction to acquire the subject voice is received, for example, when the parent or guardian who has confirmed the notification output by the display unit 44 or the voice input/output unit 46 performs a predetermined operation in the operation reception unit 45.

When the instruction for acquiring the subject voice has not been received (step S312: NO), the parent or guardian terminal 40 waits until the instruction is received.

When the instruction to acquire the subject voice has been received (step S312: YES), the parent or guardian terminal 40 requests the subject information from the server 30, and the server 30 transmits the stored subject information to the parent or guardian terminal 40.

The parent or guardian terminal 40 outputs a voice corresponding to the subject information transmitted from the server 30 via the voice input/output unit 46 (step S313).

Furthermore, the server 30 outputs the information associated with the positions of the subject terminals 10 such that the display corresponding to the subject information recorded at the position is visualized (step S212). For example, the server 30 outputs information for displaying a screen as illustrated in FIG. 9. For example, the server 30 transmits the information to the parent or guardian terminal 40 in response to a request from the parent or guardian terminal 40. The parent or guardian terminal 40 can display a screen as illustrated in FIG. 9 on the display unit 44 based on the transmitted information. In the screen of FIG. 9, the transition of the positions of the subject terminals 10 is illustrated as a trajectory, and an icon indicating a voice (a waveform in the example of FIG. 9) is displayed in association with the positions of the subject terminals 10 when the subject information is acquired. For example, when the parent or guardian or the like selects the icon indicating the voice, a corresponding voice is reproduced.

<Delivery Processing to Subject>

A processing of asynchronously delivering a voice from the parent or guardian to a subject in a case where an emergency situation occurs in the subject or the like will be described.

Figure 10:
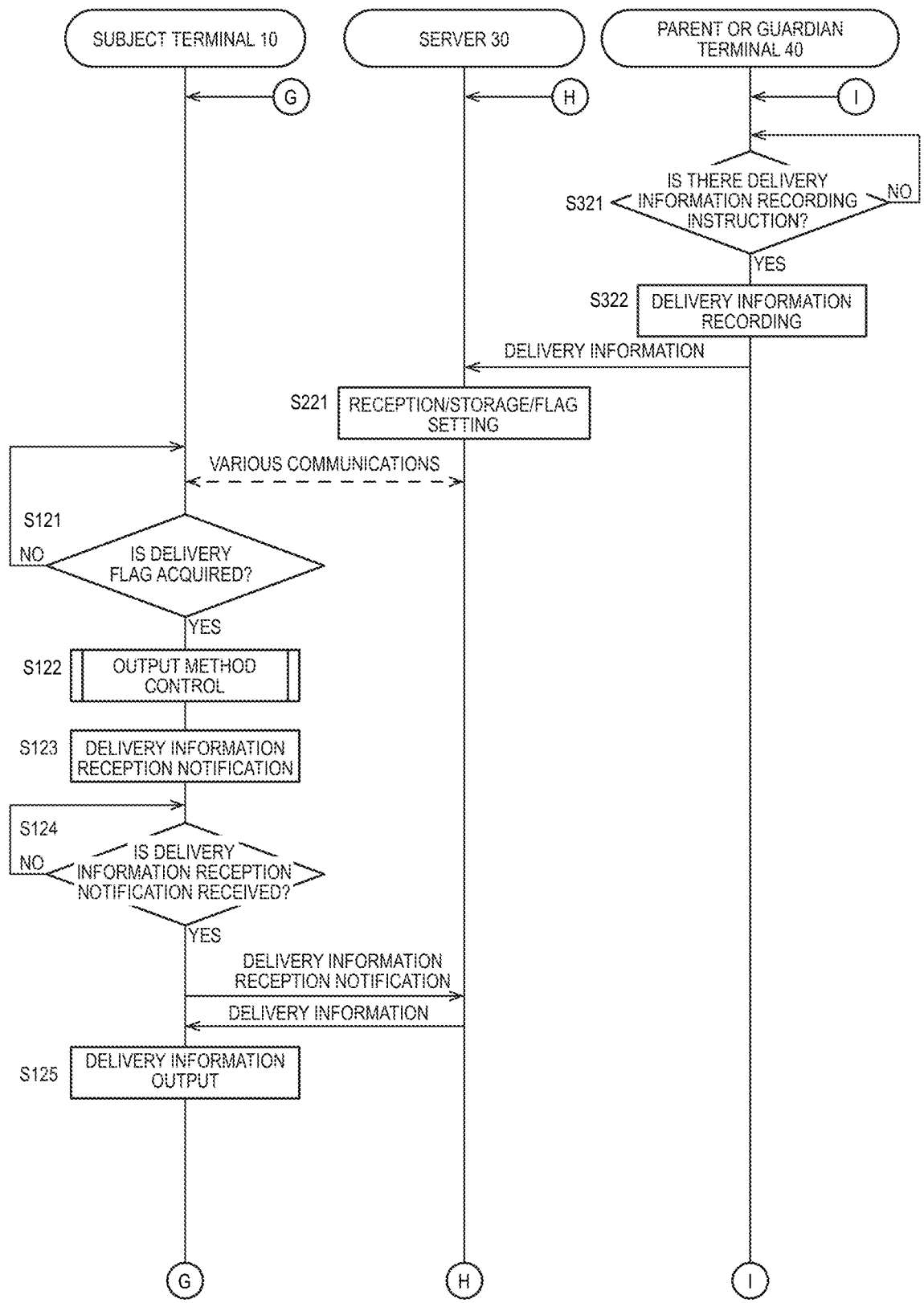
FIG. 10 is a sequence chart illustrating a flow of information delivery processing to the subject executed in the location positioning system.

FIG. 10 is a sequence chart illustrating a flow of information delivery processing to the subject executed in the location positioning system.

As illustrated in FIG. 10, the parent or guardian terminal 40 determines whether or not an instruction for recording the delivery information has been received from the parent or guardian or the like (step S321).

When the instruction for recording the delivery information has not been received (step S321: NO), the parent or guardian terminal 40 waits until the instruction is received.

When the instruction for recording the delivery information has been received (step S321: YES), the parent or guardian terminal 40 receives a voice input of the parent or guardian or the like via the voice input/output unit 46 and records the voice input as the delivery voice information (step S322). The parent or guardian terminal 40 transmits the recorded delivery information to the server 30.

The server 30 receives the delivery information transmitted from the parent or guardian terminal 40 and stores the delivery information in the storage unit 32, and sets the delivery flag for transmission to the subject terminals 10 associated in advance with the parent or guardian terminal 40 in the storage unit 32 (step S221).

The subject terminals 10 determine whether or not the delivery flag set in the server 30 is acquired when performing various communications with the server 30 (step S121).

When the delivery flag has not been acquired (step S121: NO), the subject terminals 10 stand by while continuing various processing until the delivery flag is acquired.

When the delivery flag has been acquired (step S121: YES), the subject terminals 10 determine the output method when notifying that the delivery information is received in the server 30 (step S122). Details of the output method determination processing in step S122 will be described later.

The subject terminals 10 make a notification by the method determined in the output method determination processing in step S122 (step S123).

The subject terminals 10 determine whether or not an instruction to receive the delivery information has been received from the subject or the like (step S124).

When the receiving instruction of the delivery information has not been received (step S124: NO), the subject terminals 10 wait until the receiving instruction is received.

When the instruction to receive the delivery information has been received (step S124: YES), the subject terminals 10 request the server 30 for the delivery information, and the server 30 transmits the stored delivery information to the subject terminals 10.

The subject terminals 10 output the delivery information acquired from the server 30 according to the method determined in the output method determination processing in step S122 (step S125). For example, in a case where the delivery information is a voice message and the output method in the output unit 17 is set to other than sound, a predetermined alarm indicating that the delivery information cannot be output may be output by the light, display, motion, or the like. Alternatively, the voice message may be converted into a text and displayed, or may be converted into a predetermined signal by light or motion and output.

<Output Method Determination Processing in Step S122>

Figure 11:
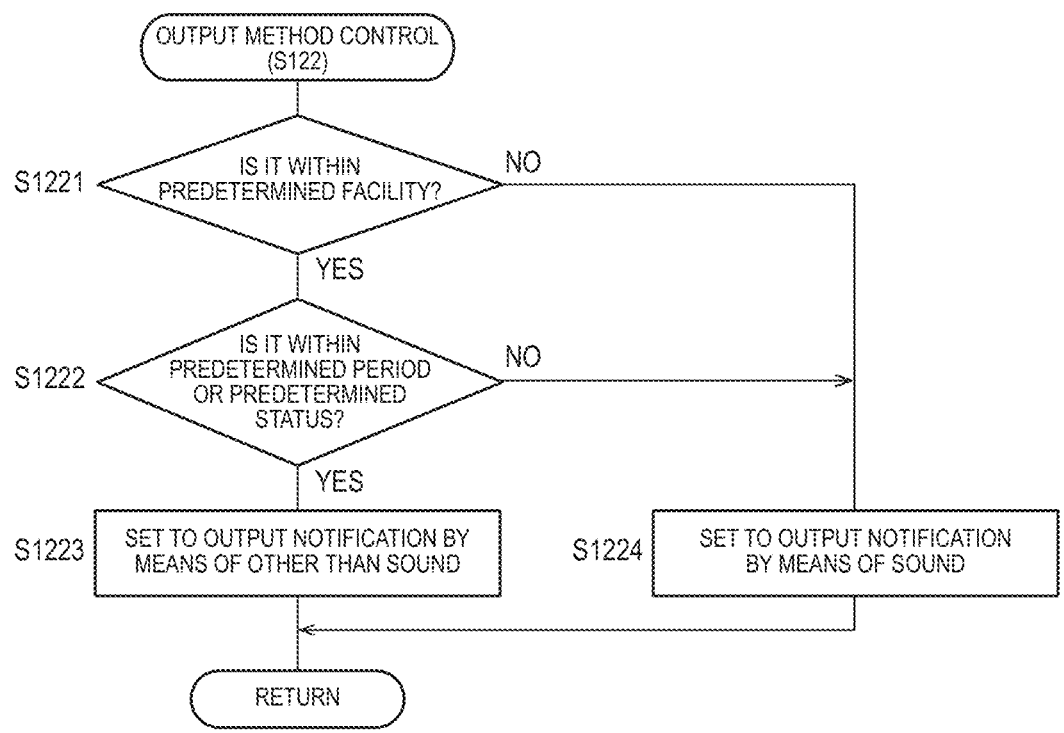
FIG. 11 is a flowchart illustrating a procedure of output method determination processing in step S122 in FIG. 10.

FIG. 11 is a flowchart illustrating a procedure of output method determination processing in step S122 of FIG. 10.

As illustrated in FIG. 11, the subject terminals 10 determine whether or not the host device is present in the predetermined facility such as a school (step S1221). For example, the subject terminals 10 inquire of the server 30 whether or not the host device is present in the predetermined facility. The server 30 specifies the positions of the subject terminals 10, determines whether or not the subject is present in the predetermined facility based on the specified position and the map information stored in the storage unit 32, and notifies the subject terminals 10 of the judgement result. The subject terminals 10 can determine whether or not the host device is present in the predetermined facility based on the judgement result notified from the server 30. The above judgement processing is not limited to the form executed in the server 30, and may be executed by the subject terminals 10 or another device.

When the notification is not present in the predetermined facility (step S1221: NO), the subject terminals 10 set the output unit 17 to output the notification by sound (step S1224), and returns to the processing of step S123 of FIG. 10.

When the subject is present in the predetermined facility (step S1221: YES), the subject terminals 10 determine whether it is within a predetermined period set for each facility or in a predetermined state according to the facility in which presence of the subject is determined in step S1221 (step S1222).

For example, in a case where the predetermined facility is a school or a classroom of various classes, the subject terminals 10 inquire of the server 30 whether or not it is within the predetermined period during which the subject is considered to be participating in a class or a lesson. The server 30 determines whether or not the subject is participating in a class or a lesson based on schedule information such as the time schedule and a lesson schedule for each facility stored in the storage unit 32 and the current time, and notifies the subject terminals 10 of the judgement result. The subject terminals 10 can determine whether or not it is within the predetermined period based on the judgement result notified from the server 30.

Furthermore, in a case where the predetermined facility is an event venue including a movie theater or a concert venue, the subject terminals 10 inquire of the server 30 whether or not it is within the predetermined period in which the subject is considered to be participating in the event (viewing a movie, a concert, or the like). The server 30 determines whether or not the subject is participating in the event based on the schedule information of the event for each facility and the current time stored in the storage unit 32, and notifies the subject terminals 10 of the judgement result. The subject terminals 10 can determine whether or not it is within the predetermined period based on the judgement result notified from the server 30.

Furthermore, in a case where the predetermined facility is a route of transportation facilities including a train or a bus, the subject terminals 10 determine whether or not the subject is in the predetermined state in which the subject is considered to be using transportation facilities in consideration of information regarding the moving speeds or the acceleration of the subject terminals 10.

In a case where it is within the predetermined period or it is not in the predetermined state (step S1222: NO), the subject terminals 10 proceed to the processing of step S1224 and sets the output unit 17 to output the notification by sound.

In a case where it is within the predetermined period or in the predetermined state (step S1222: YES), the subject terminals 10 set the output unit 17 to output the notification by at least one of the light other than sound, display, and motion (step S1223), and returns to the processing of step S123 in FIG. 10.

In addition, the present invention is not limited only to the embodiments described above, and various modifications can be made within the scope of claims.

For example, in the embodiment above, the example of the system that reliably and efficiently specifies the positions of the subject terminals 10 by combining the short-range wireless communication and the long-range wireless communication has been described, but the method of specifying the position is not limited thereto. For example, the position may be specified using only the short-range wireless communication, or the position may be specified using only the long-range wireless communication.

Furthermore, in the embodiment above, an example in which the server 30 functions as the judgement unit and the subject terminals 10 function as the determination unit has been described, but the present invention is not limited thereto. For example, the subject terminals 10 may function as the judgement unit, and the server 30 may function as the determination unit.

Furthermore, in the embodiment above, the schedule information such as the time schedule of the school has been described as being stored in advance, but the present invention is not limited thereto. For example, the situation of the subject may be judged by using a learned model that has been machine-learned in advance by teacher data including information of a day or time or position information and a state of the subject, and a notification output method may be determined.

Furthermore, in the embodiment above, the example in which the server 30 determines whether or not setting of each flag is necessary and sets each flag has been described, but the judgement and setting of each flag may be executed by the subject terminals 10. In this case, the subject terminals 10 function as the setting unit.

Furthermore, in the embodiment above, the example in which the server 30 determines whether or not setting of each flag is necessary and sets each flag has been described, but the judgement and setting of each flag may be executed by the subject terminals 10. In this case, the subject terminals 10 function as the setting unit.

Furthermore, in the processing of step S104 of FIG. 6, the description has been given assuming that the subject terminals 10 acquire the position information using the GPS function when the second time interval has elapsed. However, in a case where it can be determined from the information of the acceleration sensor or the like that the positions of the subject terminals 10 have not changed from the position where the position information was acquired using the GPS function last time, the use of the GPS function may be omitted and the previously acquired position information may be used as it is. Accordingly, the power consumption by the GPS function of the subject terminals 10 can be further suppressed.

Furthermore, in the embodiment above, an example in which each component such as the server 30 included in the location positioning system is configured as one independent device has been described, but the configuration of the device is not limited thereto. Each component may include a plurality of devices, or may be included in a device having another function. For example, the server 30 may be configured to be delivered on a cloud server including a large number of servers. Alternatively, an application having the function of the server 30 may be installed in the detection terminal 20, the parent or guardian terminal 40, or the like, and the processing of the server 30 may be executed in the detection terminals 20 or the parent or guardian terminal 40.

Furthermore, in the above embodiment, an example in which the subject terminals 10 are small dedicated terminals that can be driven by a button battery has been described, but the present invention is not limited thereto. The subject terminals 10 may be a smartphone, a tablet terminal, or the like, or may be a wearable information terminal or an embedded information terminal worn on an arm, a head, or the like of the subject. Also in this case, by applying the embodiment as described above, the position of the subject is accurately, reliably, and efficiently specified while significantly reducing the power consumption.

Furthermore, the processing of the location positioning system according to the embodiment described above may include steps other than the steps described above, or may not include some of the steps described above. In addition, the order of the steps is not limited to the embodiment described above. Furthermore, each step may be combined with another step and executed as one step, may be included in another step and executed, or may be divided into a plurality of steps and executed.

Means and methods for performing various processes in the location positioning system according to the embodiment described above can be realized by either a dedicated hardware circuit or a programmed computer. The program may be provided by, for example, a computer-readable recording medium such as a flexible disk and a CD-ROM, or may be provided online via the network such as the Internet. In this case, the program recorded in the computer-readable recording medium is usually transferred to and stored in the storage unit such as a hard disk. In addition, the program may be provided as independent application software, or may be incorporated into software of the device as one function of the location positioning system.

The location positioning system of the present embodiment configured as described above includes the subject terminals 10 that notify the reception of the delivery information directed to the subject by at least one method of the sound, light, display, and motion, and the server 30 that specifies the positions of the subject terminals 10. The location positioning system judges whether or not the subject is present in the predetermined facility based on the positions of the subject terminals 10 specified by the server 30 and map information stored in advance, and determines the notification output method in the subject terminals 10 according to the judgement result. As a result, it is possible to notify the subject of the arrival of the message by an appropriate method according to the situation of the subject and transmit the message while grasping the location of the subject to be watched over such as the child. For example, in a case where ringing of a notification alarm sound becomes a nuisance in the surroundings, such as during a class or a lesson, while participating in an event such as a movie or a concert, or while using public transportation facilities such as a train or a bus, the notification can be performed by other methods such as the light, display, and vibration without ringing the notification alarm sound. Therefore, it is possible to smoothly introduce the location positioning system with an information delivery function as in the present embodiment also in a facility such as a school.

In addition, in the location positioning system of the present embodiment, whether to output the notification by sound is determined according to the judgement result as to whether or not the subject is present in the predetermined facility. Accordingly, for example, it is possible to notify the subject of the arrival of the message by ringing the notification sound in the environment in which ringing of the notification sound does not disturb the surroundings and by ringing the notification sound in the environment in which ringing of the notification sound does not disturb the surroundings.

Furthermore, in the location positioning system of the present embodiment, the control is performed such that the notification is output by sound in a case where the subject is present outside the predetermined facility, and the notification is output by a method other than the sound in a case where the subject is present in the predetermined facility. Accordingly, while reliably notifying the subject of the arrival of the message, the subject can be notified of the arrival of the message by another method without ringing the notification sound in the environment where ringing of the notification sound becomes a nuisance in the surroundings.

In addition, in the location positioning system of the present embodiment, the predetermined facility includes a predetermined building, institution, or transportation facility, and the map information includes information regarding a route of the building, facility, and transportation facility on the map. As a result, the notification output method can be appropriately determined according to various facilities and environments in which the subject is present.

In addition, in the location positioning system of the present embodiment, in a case where it is determined that the subject is present in the predetermined facility, it is determined whether or not to output the notification by sound in further consideration of the type of the facility in which the subject exists. Thereby, according to the type of facilities in which the subject is present, it is possible to notify the subject of the arrival of the message by ringing the notification sound without ringing the notification sound in the environment in which the ringing of the notification sound becomes the nuisance to the surrounding and by ringing the notification sound in the environment in which ringing of the notification sound does not become a nuisance to the surrounding.

Furthermore, in the location positioning system of the present embodiment, in a case where the subject exists in a school or a classroom, it is judged whether or not the subject is participating in a lesson or a lesson in consideration of information regarding the schedule in the school or the classroom stored in advance as well as the time information. Then, in a case where the subject is not participating in a class or a lesson, the notification is output by sound, and in a case where the subject is participating in a class or a lesson, the notification is output by a method other than the sound. Accordingly, in a case where the subject is in class or in a lesson and the ringing of the notification sound becomes a nuisance to the surroundings, the notification can be made by other methods such as light, display, vibration, and the like without ringing the notification sound. Therefore, the location positioning system with the information delivery function of the present embodiment can be smoothly introduced even in a facility such as a school or a classroom of various classes.

Furthermore, in the location positioning system of the present embodiment, in a case where the subject is present in an event venue including a movie theater or a concert venue, it is judged whether or not the subject is participating in the event in consideration of the time information and the information regarding the schedule in the event venue stored in advance. Then, in a case where the subject is not participating in the event, the notification is output by sound, and in a case where the subject is participating in the event, the notification is output by a method other than sound. Accordingly, in a case where the subject is watching a movie, a concert, or the like and the ringing of the notification sound becomes a nuisance to the surroundings, the notification can be performed by other methods such as light, display, vibration, or the like without ringing the notification sound. Since the message can be delivered to the subject without causing nuisance to the surroundings, the subject does not feel unpleasant, and the parent or guardian can send the message at any time without worrying about the situation in which the subject is placed. As a result, it is possible to smoothly accept the location positioning system with the information delivery function of the present embodiment also in the entire society.

In addition, in the location positioning system of the present embodiment, the notification output method is determined in further consideration of the information regarding the moving speeds or the acceleration of the subject terminals acquired from the subject terminal. Accordingly, it is possible to more accurately grasp the situation in which the subject is placed and then notify the subject by a more appropriate method according to the situation.

Furthermore, in the location positioning system of the present embodiment, in a case where the subject is present in the route of transportation facilities including a train or a bus, it is judged whether or not the subject is utilizing transportation facilities in consideration of information regarding the moving speeds or the acceleration of the subject terminal acquired from the subject terminal. Then, the control is performed such that the notification is output by sound in a case where the subject is not utilizing transportation facilities, and the notification is output by a method other than the sound in a case where the subject is utilizing transportation facilities. As a result, in a case where the subject is utilizing a train or a bus and the ringing of the notification sound becomes a nuisance to the surroundings, the notification can be performed by other methods such as light, display, vibration, and the like without ringing the notification sound. Since the message can be delivered to the subject without causing nuisance to the surroundings, the subject does not feel unpleasant, and the parent or guardian can send the message at any time without worrying about the situation in which the subject is placed. As a result, it is possible to smoothly accept the location positioning system with the information delivery function of the present embodiment also in the entire society.

In the location positioning system of the present embodiment, the server 30 receives the delivery information to be delivered to the subject terminals 10, and sets the delivery flag when the delivery information is received. When acquiring the delivery flag from the server 30, the subject terminals 10 notify the subject of the reception of the delivery information. When receiving the receiving instruction for receiving the delivery information, the subject terminals 10 communicate with the server 30 to receive the delivery information, and outputs the delivery information according to the determined output method. Accordingly, the parent or guardian or the like can deliver an arbitrary message to the subject terminals 10 asynchronously. Since the message is delivered asynchronously, the parent or guardian can transmit the message at any timing regardless of the situation of the subject. In addition, the subject can confirm the delivery information at a convenient timing after confirming the notification. Furthermore, the subject terminals 10 do not need to be always on standby to receive a contact, and it is sufficient when the delivery flag of the server 30 is confirmed at a predetermined timing or the delivery information is acquired based on the instruction of the subject. Therefore, the power consumption of the subject terminals 10 can be suppressed to achieve power saving and long life. Furthermore, since the output method is determined according to the situation of the subject even in a case where the delivery information is received, for example, even in a case where the delivery information is a voice message, the delivery information can be confirmed by a method that does not cause nuisance to the surroundings.

Moreover, in the location positioning system of the present embodiment, the subject terminals 10 acquire the position information of the subject terminals 10 based on the signal from the GPS satellite, and transmit the identification information and the position information to the server 30 through the long-range wireless communication, and the server 30 specifies the positions of the subject terminals 10 based on the identification information and the position information transmitted from the subject terminals 10. As a result, for example, even in a case where a message is delivered to a general portable communication terminal such as a smartphone or a mobile phone with the GPS function, the processing of determining the notification output method as in the present embodiment can be applied.

Furthermore, in the location positioning system of the present embodiment, the subject terminals 10 transmit the identification information through a short-range radio, and the identification information is transmitted to the server 30 via the detection terminals 20 arranged in the watching area, and the server 30 specifies the position of the subject terminals 10 based on the identification information transmitted from the detection terminals 20 and the information related to the position of the detection terminals 20. Accordingly, it is possible to notify the subject by an appropriate method according to the situation of the subject while accurately grasping the position of the subject.

Furthermore, in the location positioning system of the present embodiment, the detection terminal 20a is installed at a predetermined position included in the watching area and transmits information for specifying the detection terminal 20a, and the server 30 uses the information for specifying the detection terminal 20a transmitted from the detection terminal 20a to acquire the information related to the position of the detection terminal 20a from the storage unit 32 in which the information and the position of the detection terminal 20a are stored in advance in association with each other. Accordingly, the position of the subject terminal can be accurately specified using the detection terminal 20a that is the fixed terminal installed in the watching area and in which the position information is stored in advance.

Furthermore, in the location positioning system of the present embodiment, the detection terminal 20b is provided in the mobile body that moves in an area including the watching area, acquires information regarding the position of the detection terminal 20b based on a signal from the GPS satellite, and transmits the information to the server 30. Then, the server 30 acquires the information regarding the position of the detection terminal 20b based on the information transmitted from the detection terminal 20b. As a result, the information terminal such as a smartphone carried by a watching person moving in the watching area or a tablet PC installed in a moving taxi or the like can be used as the detection terminal. Therefore, the positions of the subject terminals 10 can be accurately specified without installing the fixed terminal throughout the watching area.

REFERENCE SIGNS LIST

10: Subject terminal
11: Control unit
12: Storage unit
13: First communication unit
14: Second communication unit
15: Reception unit
151: Acquisition instruction reception unit
152: Receiving instruction reception unit
16: Acquisition unit
17: Output unit
20, 20a, 20b: Detection terminal
21: Control unit
22: Storage unit
23: Communication unit
24: Detection unit
30: Server
31: Control unit
32: Storage unit
33: Communication unit
40: Parent or guardian terminal
41: Control unit
42: Storage unit
43: Communication unit
44: Display unit
45: Operation reception unit
46: Voice input/output unit

The invention claimed is:
1. A location positioning system, comprising:
a subject terminal carried by a subject, the subject terminal being capable of transmitting identification information for specifying a position of the subject terminal through wireless communication and receiving deliv- ery information directed to the subject, including an output unit that notifies with a notification the subject of reception of the delivery information by at least one method of sound, light, display, and motion;

a detection terminal configured to be present in a region including a watching area of the subject that is preset, to detect the subject terminal that is communicable through a short-range wireless communication, and to acquire identification information transmitted from the subject terminal and transmit the identification information to a server in case where the subject terminal is detected;

a server configured to specify a position of the subject terminal based on the identification information transmitted from the subject terminal;

a judgement unit configured to judge whether or not the subject is present in a predetermined facility based on a position of the subject terminal specified by the server and map information stored in advance; and a determination unit configured to determine an output method in the output unit of the subject terminal according to a judgement result in the judgement unit, wherein the subject terminal includes a first communication unit configured to output a signal for performing the short-range wireless communication at a first time interval and transmit the identification information through the short-range wireless communication, and a second communication unit configured to acquire position information of the subject terminal based on a signal from a GPS satellite at a second time interval that is at least longer than the first time interval, and to transmit the identification information and the position information to the server through a long-range wireless communication that has a longer communication distance than the short-range wireless communication, and the server includes an acquisition unit configured to acquire the identification information transmitted from the detection terminal and information regarding a position of the detection terminal;

a first specifying unit configured to specify a position of the subject terminal based on the identification information acquired by the acquisition unit and information regarding a position of the detection terminal; and a second specifying unit configured to specify a position the subject terminal based on the identification information transmitted from the second communication unit of the subject terminal and the position information.

2. The location positioning system according to claim 1, wherein the determination unit determines whether or not to output the notification by sound according to the judgement result.

3. The location positioning system according to claim 1, wherein the determination unit outputs the notification by sound in a case where the subject is outside the facility, and outputs the notification using a method other than sound in a case where the subject is present in the facility.

4. The location positioning system according to claim 1, wherein the facility include a predetermined building, institution, or transportation facility, and the map information includes information regarding buildings, facilities, and a route of transportation facilities on a map.

5. The location positioning system according to claim 1, wherein the determination unit determines whether or not to output the notification by sound in further consideration of a type of the facility in which the subject is present in a case where it is determined in the judgement result that the subject is present in the facility.

6. The location positioning system according to claim 1, wherein the facility is a school or a classroom;

the judgement unit further determines whether or not the subject is participating in a class or a lesson in consideration of time information and information regarding a schedule in the facility stored in advance in a case where the subject is present in the facility; and the determination unit outputs the notification by sound in a case where the subject is not participating in a class or a lesson, and outputs the notification by a method other than sound in a case where the subject is participating in a class or a lesson.

7. The location positioning system according to claim 1, wherein the facility is an event venue including a movie theater or a concert venue;

the judgement unit further determines whether or not the subject is participating in an event in consideration of time information and information regarding a schedule in the facility stored in advance in a case where the subject is present in the facility; and the determination unit outputs the notification by sound in a case where the subject is not participating in an event, and outputs the notification by a method other than sound in a case where the subject is participating in an event.

8. The location positioning system according to claim 1, wherein the determination unit determines an output method in the output unit in further consideration of information regarding moving speeds or acceleration of the subject terminal acquired from the subject terminal.

9. The location positioning system according to claim 8, wherein the facility is a route of a transportation facility including a train or a bus;

the judgement unit further judges whether or not the subject is using the transportation facility in further consideration of information regarding moving speeds or acceleration of the subject terminal acquired from the subject terminal in a case where the subject is present in the facility; and the determination unit outputs the notification by sound in a case where the subject is not utilizing the transportation facility, and outputs the notification by a method other than sound in a case where the subject is utilizing the transportation facility.

10. The location positioning system according to claim 1, wherein the server includes a receiving unit configured to receive delivery information to be delivered to the subject terminal;

a setting unit configured to set a delivery flag in a case where the delivery information is received by the receiving unit; and a transmission unit configured to transmit the delivery information to the subject terminal, and the subject terminal notifies the subject of reception of the delivery information by the output unit when the delivery flag is acquired from the server.

11. The location positioning system according to claim 1, wherein the subject terminal further includes a receiving instruction reception unit configured to accept a receiving instruction for receiving the delivery information, and the subject terminal communicates with the server to receive the delivery information, and determines an output method of the delivery information according to a judgement result of the judgement unit, in a case where the receiving instruction has been received in the receiving instruction reception unit.

12. The location positioning system according to claim 1, wherein the detection terminal is installed at a predetermined position included in the watching area and transmits information for specifying the detection terminal, and the server uses the information for specifying the detection terminal transmitted from the detection terminal, to acquire the information regarding the position of the detection terminal from a storage unit in which the information and the position of the detection terminal are stored in advance in association with each other.

13. The location positioning system according to claim 1, wherein the detection terminal is provided in a mobile body that moves in an area including the watching area, acquires information regarding a position of the detection terminal based on a signal from the GPS satellite, and transmits the information to the server, and the server acquires information regarding a location of the detection terminal based on the information transmitted from the detection terminal.

14. The location positioning system according to claim 1, wherein the subject terminal acquires position information of the subject terminal based on a signal from a GPS satellite, at a different frequency based on moving speeds and a transition of a position of the subject terminal, and transmits the identification information and the position information to the server through a long-range wireless communication.

* * * * *